A. A. BERNARTZ, R. F. HALDEWANG & C. BRAUNSDORF.
CHRISTMAS TREE HOLDER.
APPLICATION FILED FEB. 20, 1914.
1,117,158. Patented Nov. 17, 1914.
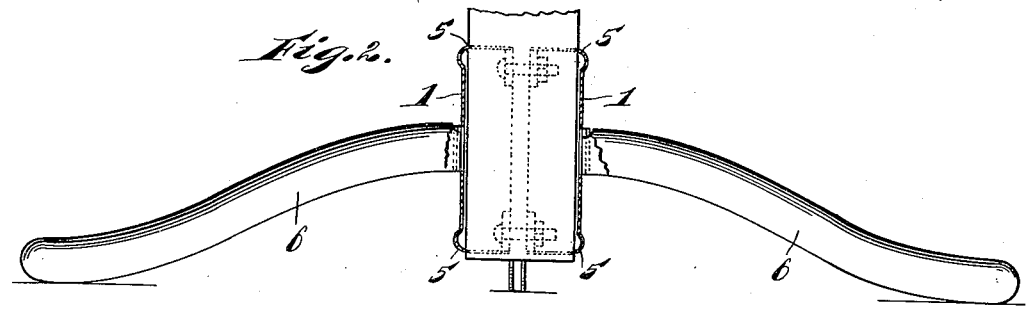
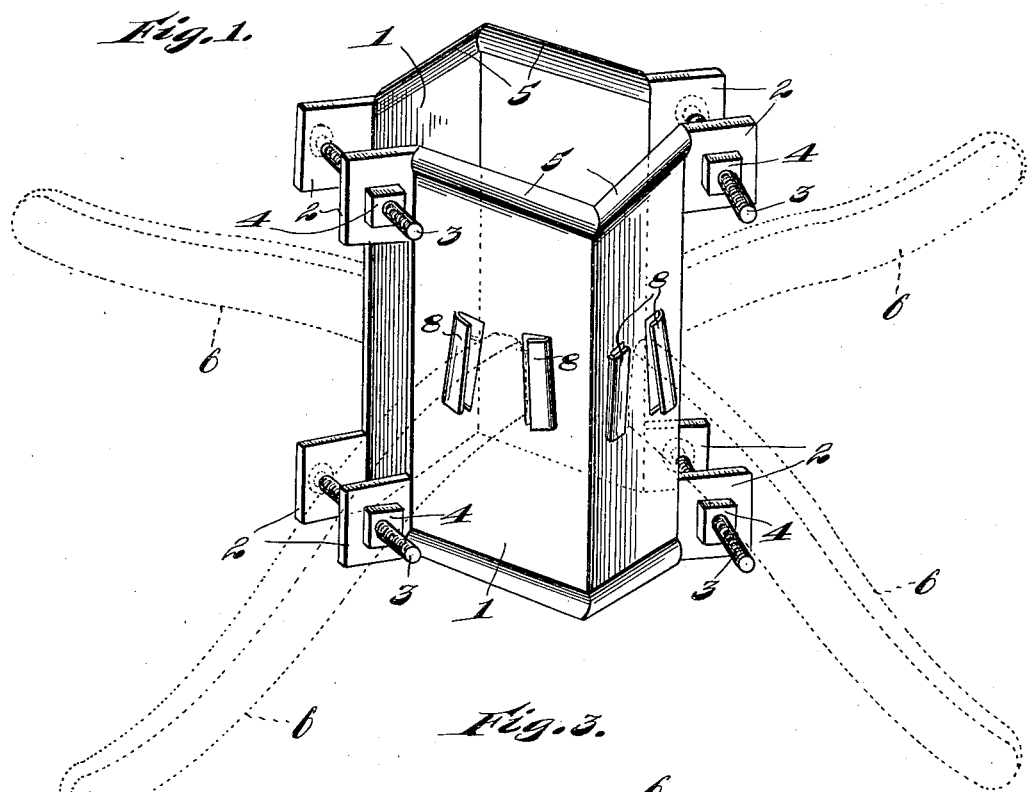
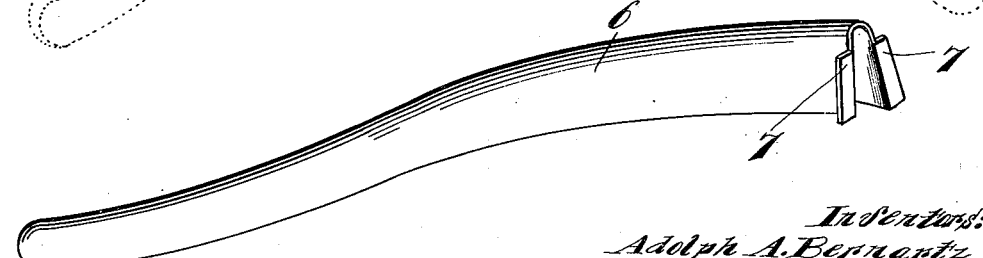

UNITED STATES PATENT OFFICE.

ADOLPH A. BERNARTZ, RICHARD F. HALDEWANG, AND CHARLES BRAUNSDORF, OF CHICAGO, ILLINOIS.

CHRISTMAS-TREE HOLDER.

1,117,158.  Specification of Letters Patent.  Patented Nov. 17, 1914.

Application filed February 20, 1914. Serial No. 819,966.

*To all whom it may concern:*

Be it known that we, ADOLPH A. BERNARTZ, RICHARD F. HALDEWANG and CHARLES BRAUNSDORF, citizens of the United States, and residents of the city of Chicago, county of Cook, and State of Illinois, have invented certain new and useful Improvements in Christmas-Tree Holders, of which the following is a specification.

Our invention relates to improvements in Christmas tree holders, and has for its object the production of a device of this character which will be of simple and economical construction; one which will be of an adjustable nature so as to be adapted for use in conjunction with trees of various sizes; one which will be of a collapsible nature so as to permit of collapsing into small compass for storage or shipment; and one which will be efficient in use.

Other objects will appear hereinafter.

Our invention consists in the combinations and arrangements of parts hereinafter described and claimed.

The invention will be best understood by reference to the accompanying drawing forming a part of this specification, and in which, Figure 1 is a perspective view of a holder embodying our invention, the supporting legs thereof being shown in dotted lines, Fig. 2 is a central section of the holder, showing the same embracing the lower end portion of a tree stem, and Fig. 3 is a perspective view of one of the legs of the holder detached.

The preferred form of construction as illustrated in the drawing comprises two similar clamping members 1 which are formed of metal, each being of angular form in cross section so as to adapt the same for automatically centering the tree stem which is positioned between said clamping members when the device is in use. Provided at the longitudinal edges of the members 1 at the extremities thereof are laterally projecting ears or lugs 2 with which coöperate bolts 3 and nuts 4 for adjusting the members 1 into clamping relation with the tree stem positioned between the same, as will be readily understood. Provided at the upper and lower edges or ends of the members 1 are inwardly turned flanges 5 which constitute gripping jaws adapted to securely engage or pierce the tree stem in conjunction with which the device is used so as to prevent relative longitudinal movement of the same in the holder.

Coöperating with the clamp thus formed are legs 6, four in number which are preferably of the design shown. Each of the legs 6 is provided at its inner end with laterally projecting engaging flanges 7 adapted to interlock with outwardly turned engaging flanges 8 which are formed in each side of each of the members 1, as clearly shown in Fig. 1. The flanges 8 are arranged in pairs, as shown, each pair constituting a socket adapted for engagement with the flanges 7 at the ends of said legs, said flanges 8 as well as the flanges 7 being converged upwardly so as to limit the upward or engaging movement of the inner ends of the legs in the connection of the latter to the members 1, it being clear that, with this construction, when the flanges 7 are seated against the flanges 8, upward movement thereof will be arrested and thus the flanges 7 and 8 maintained in interlocking relation. The pressure or weight of the tree in the holder will serve to further press the flanges 7 and 8 into secure engagement with each other. Also, with this arrangement, it will be seen that the legs 6 are detachably connected with the members 1 so as to permit of ready disconnection of the former when desired in order to permit of collapsing of the device into a small compass for storage or shipment.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having described our invention what we claim as new and desire to secure by Letters Patent is:

1. A device of the class described comprising a pair of clamping members adapted to engage against opposite sides of the tree stem arranged between the same; means for adjusting said members toward each other; outwardly turned engaging flanges on said clamping members; and outwardly projecting legs having engaging flanges at their inner ends adapted to releasably interlock with said engaging flanges on said clamping members, substantially as described.

2. A device of the class described comprising a pair of clamping members adapted to engage against opposite sides of the tree stem arranged between the same; means for adjusting said members toward each other; outwardly turned engaging flanges on said clamping members arranged in pairs; and outwardly projecting legs having laterally projecting engaging flanges at their inner ends adapted to releasably interlock with said engaging flanges on said clamping members, substantially as described.

3. A device of the class described comprising a pair of clamping members adapted to engage against opposite sides of the tree stem arranged between the same; means for adjusting said members toward each other; outwardly turned substantially vertically extending engaging flanges on said clamping members arranged in pairs, the flanges of each pair converging upwardly; and outwardly projecting legs having laterally projecting engaging flanges at their inner ends adapted to releasably interlock with said engaging flanges on said clamping members, said last mentioned flanges being disposed to correspond with the disposition of said first mentioned flanges, substantially as described.

4. A device of the class described comprising a pair of clamping members angular in cross section; inwardly turned gripping portions at the ends of said clamping members; means for adjusting said clamping members toward each other; and legs connected with and extending outwardly from said clamping members, substantially as described.

In testimony whereof we have signed our names to this specification in the presence of two subscribing witnesses.

ADOLPH A. BERNARTZ.
RICHARD F. HALDEWANG.
CHARLES BRAUNSDORF.

Witnesses:
JOSHUA R. H. POTTS,
HELEN F. LILLIS.